March 28, 1939.  M. B. BRIGGS  2,151,851
STEERING STABILIZER
Filed May 17, 1937
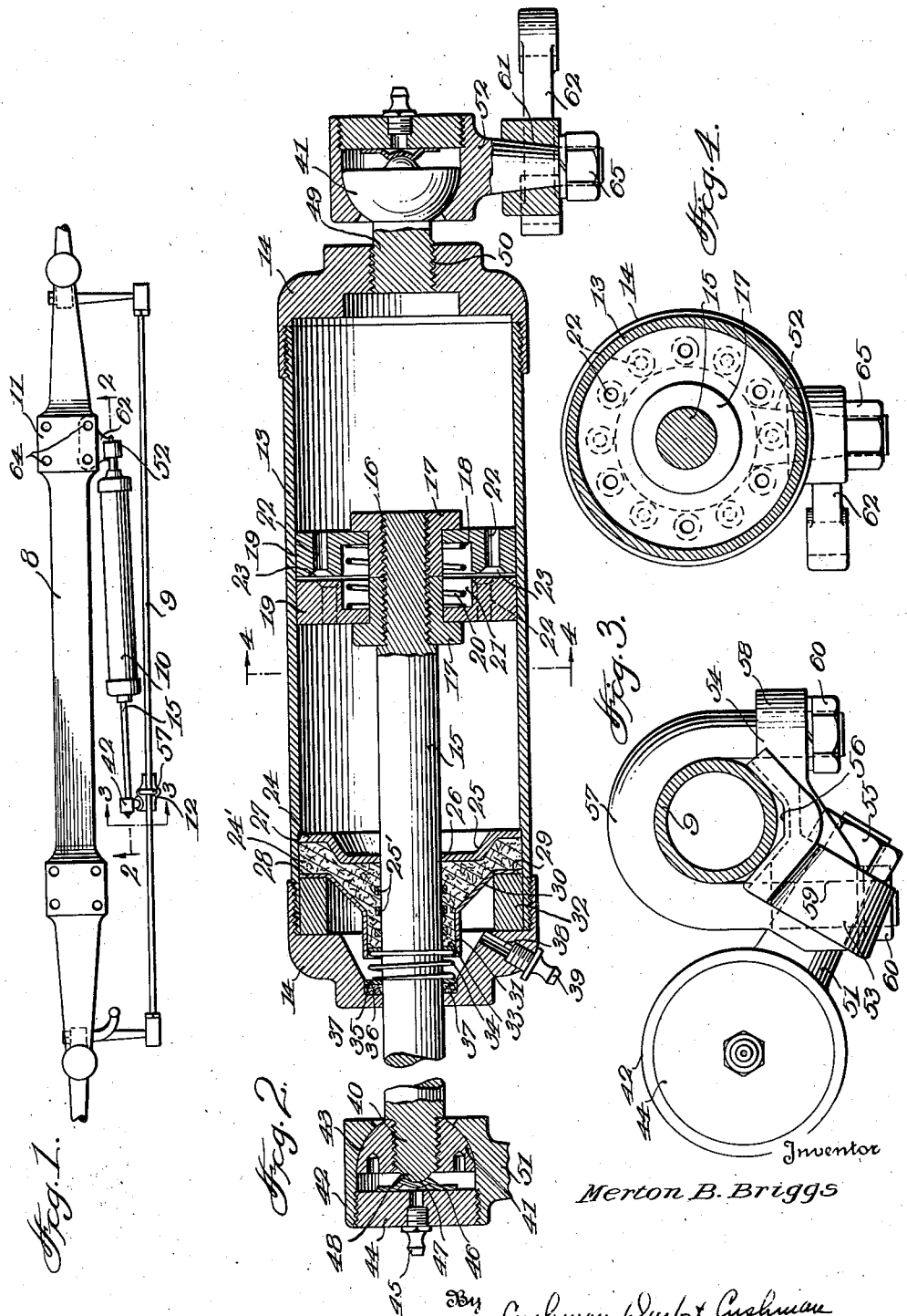
Inventor
Merton B. Briggs
By Cushman Darby & Cushman
Attorneys Patented Mar. 28, 1939

2,151,851

UNITED STATES PATENT OFFICE 2,151,851

STEERING STABILIZER

Merton B. Briggs, Pittsburgh, Pa., assignor to
I. A. Simon, Pittsburgh, Pa.

Application May 17, 1937, Serial No. 143,157

5 Claims. (Cl. 280—90)

This invention relates to stabilizers for the steering mechanisms of motor vehicles and is an improvement upon the devices shown in the patent to MacLellan, No. 2,058,384, October 20, 1936, and the pending application of Hedrick et al., Serial No. 87,580.

Stabilizers of this type include a cylinder containing a fluid such as oil and in which is disposed a piston having slots or perforations to permit the retarded passage of fluid through the piston head. By mounting the stabilizer between a fixed element of the vehicle and an element of the steering mechanism, the stabilizer will absorb sudden road shocks which might throw the vehicle out of the control of the driver; the stabilizer does not interfere with normal steering operations, but becomes instantaneously operative when the wheels to which the steering mechanism is attached are subjected to sudden shocks or impacts.

It is necessary that the stabilizer be thoroughly reliable at all times, and the present invention relates to a stabilizer in which leakage of the fluid from the cylinder is effectively prevented, while at the same time, the piston may move to and fro within the cylinder under normal driving conditions. In this manner, once the cylinder is supplied with the requisite amount of working fluid and closed, notwithstanding continual movement of the piston, the fluid supply remains substantially constant. It is an important feature of the construction that the sealing means is fixed within the cylinder.

The stabilizer is very simple in construction, readily assembled, and can be easily applied to any vehicle.

Referring to the drawing,

Figure 1 is a top elevation illustrating the stabilizer associated with a front axle and tie rod of a vehicle;

Figure 2 is a sectional view of the stabilizer taken on the line 2—2 of Figure 1;

Figure 3 is an elevation, partly in section, looking in the direction of the arrows 3—3 of Figure 1;

Figure 4 is a sectional view taken on the line 4—4 of Figure 2.

As explained above, this invention is useful where the stabilizer is employed in connection with a steering mechanism which is associated with a full axle, or where independent wheel suspensions are employed. In the drawing, I have illustrated for purposes of convenience the stabilizer applied to a construction embodying the usual axle and tie rod.

Referring to Figure 1, the numeral 8 indicates the front axle of a vehicle and the numeral 9 the tie rod. The numeral 10 indicates the stabilizer attached at one end to the spring pad 11 of the axle and at its opposite end as shown at 12 to the tie rod. It is preferred to attach the piston to the tie rod and the cylinder to the fixed part of the vehicle.

Referring to Figure 2, the stabilizer comprises a cylinder 13 adapted to contain a viscous fluid such as oil to be enclosed at its ends by threaded caps 14. The piston rod is indicated at 15 and at one end is threaded as shown at 16. Secured to the threaded end 16 are a pair of nuts 17 which define a recess 18 in which are disposed the valve elements 19. The recess 18 is adjusted to a size to permit the valve elements to slide therein to a limited extent, and the elements are held apart by means of a coil spring 20 which is disposed in aligned recesses 21 in the elements. Formed in the valve elements are openings 22 having flared entrant portions 23 which are arranged in staggered relation to each other as shown. The valve elements have a close fit with the inner wall of the cylinder 13 but are readily slidable therein. The construction just described is similar to that in the Hedrick et al. application above referred to.

At one end, the cylinder is provided with a packing for the piston rod 15, which packing includes a metal plate 24 which is dished centrally as shown at 25 and has an opening 26 for the passage of the piston rod. At its periphery, the plate 24 engages a shoulder 27 on the inner wall of the cylinder whereby the plate is held against bodily movement inwardly of the cylinder. The packing also includes a metal plate member 28 which is preferably thinner than the plate 24 and has a straight portion 29, a conical portion 30 and a cylindrical portion 31. Between the plate members is disposed a suitable packing material 24', which is held in compressed condition. For this purpose, a collar or ring 32 bears against the inner wall of the adjacent cap 14 on one edge and at its opposite edge bears against the straight portion 29 of the plate 28 whereby the same is held against bodily movement outwardly of the cylinder; also, a loose plate 33 is disposed in the cylindrical end 31 of the plate 28 to engage the packing and is maintained under pressure by reason of the spring 34 which, at its opposite end, engages a loose plate 35 which in turn compresses a suitable packing material 36 disposed in a recess 37 in the cap 14. Thus, an operating chamber adapted to contain the hydraulic fluid is formed between plate 24 and the sealing means 14 on the opposite end of the cylinder. The plates 33 and 35 and the packing 36 as well as the adjacent cap 14 are provided with an opening for the passage of the piston rod 15, and it will be observed that the spring 34 is preferably a coil spring surrounding the piston rod. By reason of this construction, the packing is maintained compressed at all times while allowing the piston rod 15 to move freely under normal steering.

The cap nut adjacent the packing structure just described is provided with an opening 38 in which is threaded a suitable lubricating fitting 39 of the "Alemite" type whereby lubricant may be supplied to the chamber defined by the cap and the plate 28 for lubricating the piston rod.

Within the packing 24' is disposed a plurality of packing rings 25' surrounding the piston, which are preferably of some relatively harder packing material. The purpose of the spaced rings 25' is to further prevent the leakage of fluid from the cylinder and to avoid any possibility of grease from the chamber on the other side of the packing from leaking into the cylinder.

The piston rod has a threaded reduced end 40 upon which is threaded a half ball nut 41. The ball nut 41 is enclosed in a cylindrical housing 42, the inner wall of which is curved as shown at 43 to form a universal or ball and socket connection. The cylinder 42 is closed by a nut 44 having a lubricating fitting 45 and the nut bears upon a spring member 46 which is centrally provided with a curved recess 47 receiving the curved end 48 of the reduced end 40 of the piston rod 15. At the opposite end of the cylinder, the ball member 41 is provided with an integral threaded stem 49 engaging in a threaded opening 50 in the adjacent cap 14.

Each of the universally mounted housings 42 is provided with an integral leg 51, 52, and one leg is connected to a fixed part of the vehicle, while the other leg is connected to the steering mechanism. Thus, in the preferred method of mounting, the leg 52 is connected to the axle, or to a fixed part of the frame while the leg 51 which is associated with the piston is connected to the tie rod. When so connected, the openings 22 in the valve elements 19 will pass the fluid freely so that the vehicle may be steered in the usual manner. When a sudden shock or road impact is encountered, the fluid pressure on one or the other faces of the valve elements will cause the same to move into contact with the other valve element, thereby shutting off the flow of fluid, and this action is so instantaneous due to the staggered relation of the openings and the flared entrant portions thereof on the inner faces of the valve elements, that the wheels are prevented from veering and the steering of the vehicle is maintained within the control of the driver.

Referring to Figure 3, the leg 51 is conical as shown and is held in a tapering boss 53 of a tie rod bracket 54 by means of a nut 55. This bracket 54 has a saddle 56 in which the tie rod 9 is disposed, and the bracket and tie rod are held together by means of the yoke 57 extending through opposed openings 58 and 59 in the bracket, the free ends of the yoke being held tightly to the bracket by means of nuts 60. It is to be noted, that on that side of the bracket having the boss 53, the opening 59 is of considerable length, and the yoke 57 has a long arm for passage through this elongated opening so that the nut 60 may be readily applied.

At the cylinder end of the stabilizer, the tapered leg 52 engages in a tapered opening 61 of a substantially triangular bracket 62 which is bolted to the spring pad 11 as at 64. The tapered leg 52 is secured to the bracket by means of the nut 65. In this manner, the stabilizer is connected at the cylinder end to a fixed part of the vehicle and the piston is connected to the steering tie rod 9 or movable part of the steering mechanism.

It is to be understood that the invention herein shown and described is subject to numerous modifications and variations, all of which are considered to be comprehended within the scope of the appended claims.

I claim:

1. A steering stabilizer comprising a cylinder, a piston rod movable therein having a piston head including valve means, and a packing through which the piston rod reciprocates disposed within the cylinder and forming an end wall of a working chamber therein, said packing including a layer of compressible material, a backing plate, held against bodily movement outwardly of the cylinder and a movable plate on the chamber side thereof and held against bodily movement inwardly of the cylinder, said last named plate being movable when said valve means lock and are moved in the direction of the plate, such movement of the plate being effective to compress and expand the compressible material laterally to seal the chamber.

2. A steering stabilizer comprising a cylinder, a piston rod movable therein having a piston head including valve means, and a packing through which the piston rod reciprocates disposed within the cylinder and forming an end wall of a working chamber therein, said packing including a layer of compressible material, a backing plate, held against bodily movement outwardly of the cylinder and a dish-shaped movable plate on the chamber side thereof and held against bodily movement inwardly of the cylinder, said movable plate being moved when said valve means lock and are moved in the direction of the plate, such movement of the plate being effective to compress and expand the compressible material laterally to seal the chamber about the piston rod.

3. A steering stabilizer comprising a cylinder, a piston rod movable therein having a piston head including valve means, and a packing through which the piston rod reciprocates disposed within the cylinder and forming an end wall with a working chamber therein, said packing including a layer of compressible material and plate members on opposite sides thereof, one of said members being held against movement outwardly of the cylinder and another of said members being held against bodily movement inwardly of the cylinder and movable with respect to the cylinder wall when said valve means are locked and moving in the direction of the members to compress and expand the compressible material at the cylinder wall.

4. A steering stabilizer comprising a cylinder, a piston rod movable therein having a piston head including valve means, and a packing through which the piston rod reciprocates disposed within the cylinder and forming an end wall with a working chamber therein, said packing including a layer of compressible material and plate members on opposite sides thereof, one of said members being held against movement outwardly of the cylinder and another of said members being held against bodily movement inwardly of the cylinder and movable with respect to the cylinder wall when said valve means are locked and moving in the direction of the members to compress and expand the compressible material about the piston rod.

5. A steering stabilizer comprising a cylinder, a piston rod movable therein having a piston head including valve means, and a packing through which the piston rod reciprocates disposed within the cylinder and forming an end wall with a working chamber therein, said packing including a layer of compressible material and plate members on opposite sides thereof, each of said plate members having a frustro-conical depression and one of said plate members being movable with respect to the cylinder wall when the valve means are locked and moving in the direction of the members to compress the compressible material between the members and expand the material and seal the chamber.

MERTON B. BRIGGS.